July 17, 1951    B. S. HARRINGTON    2,561,274
CUTTING APPARATUS
Filed Nov. 28, 1947    2 Sheets-Sheet 2
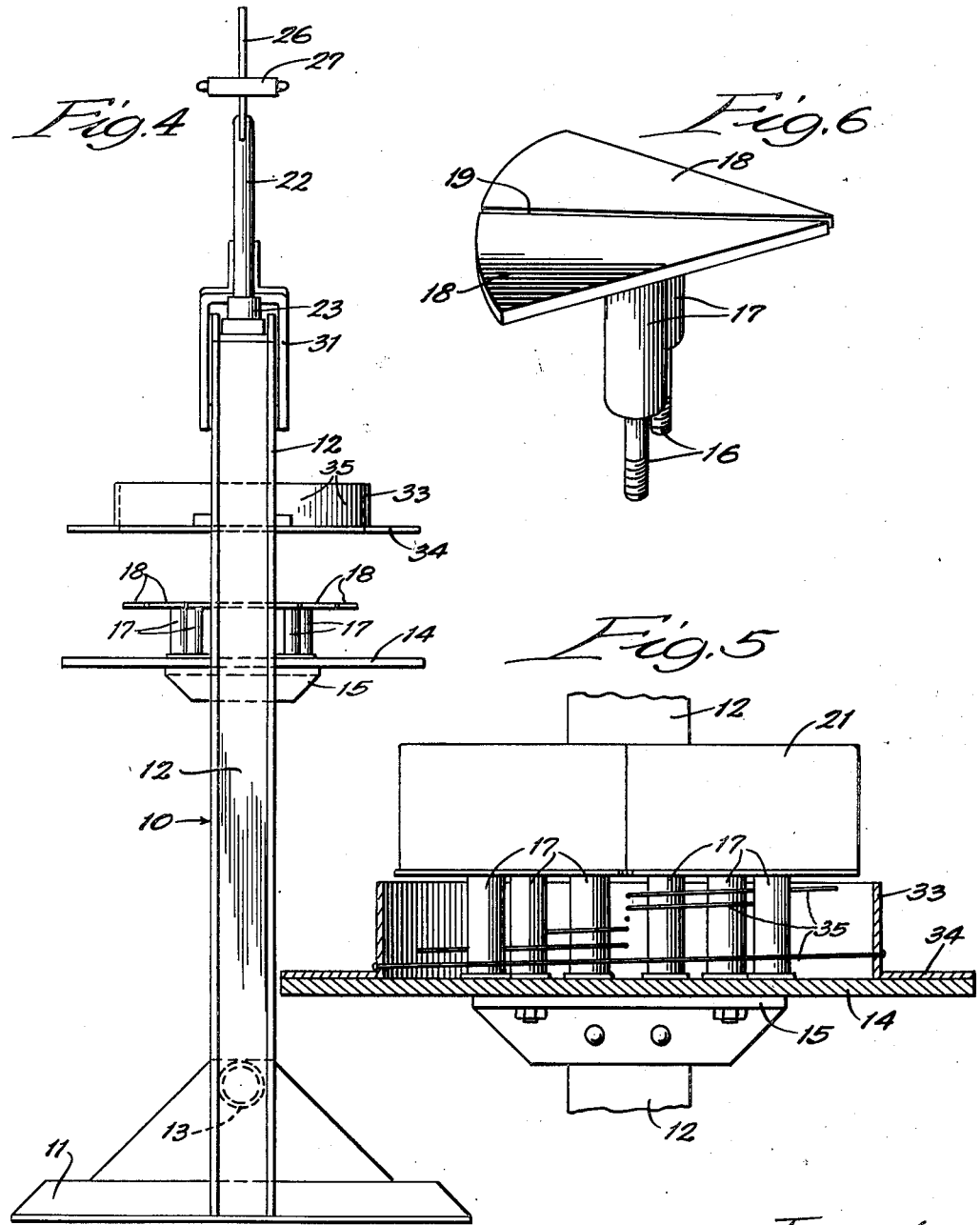
Inventor:
Bertie S. Harrington,
By Carl C. Batz,
Attorney.

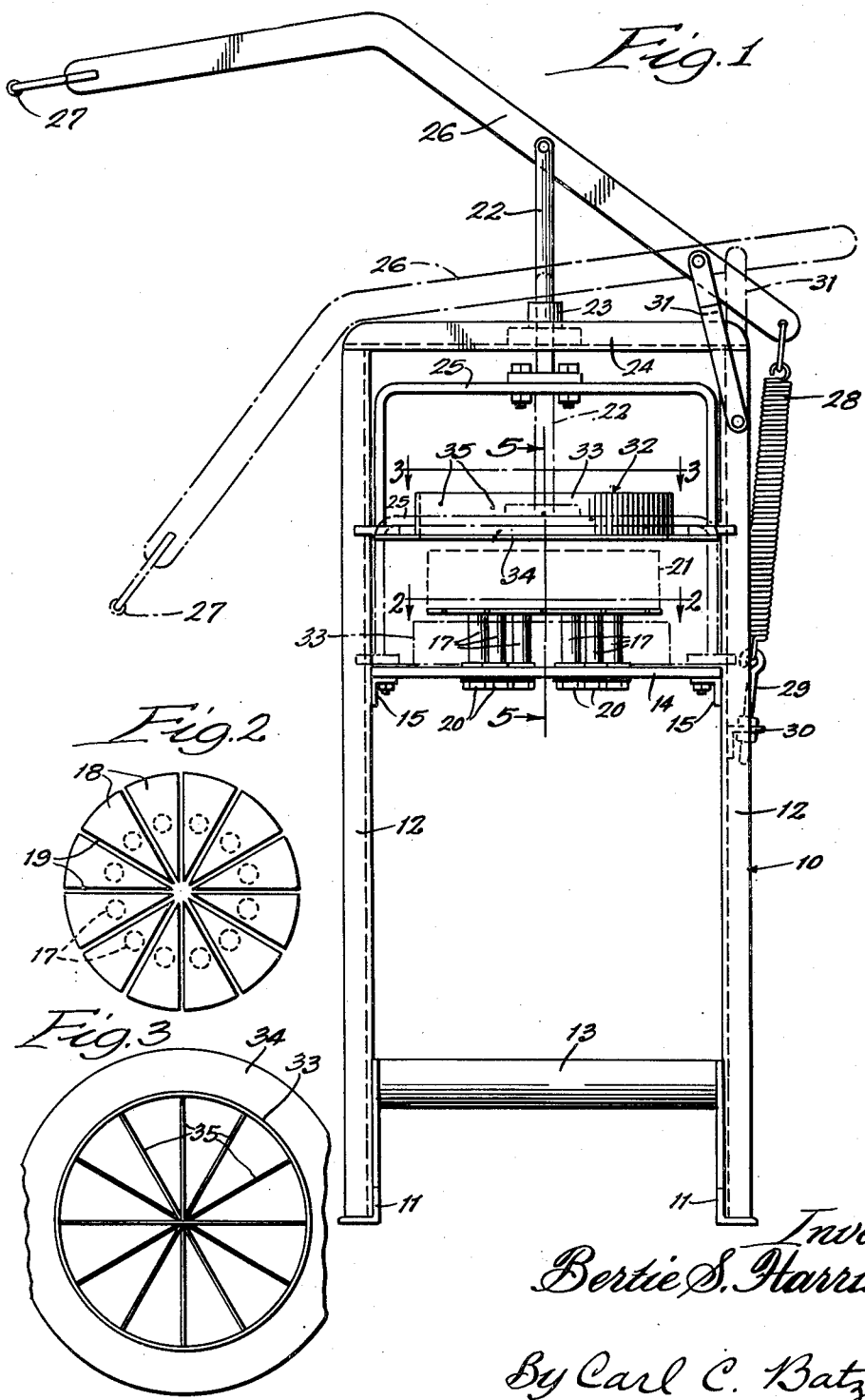

Patented July 17, 1951

2,561,274

UNITED STATES PATENT OFFICE 2,561,274

CUTTING APPARATUS

Bertie S. Harrington, Chicago, Ill., assignor to Armour and Company, Chicago, Ill., a corporation of Illinois Application November 28, 1947, Serial No. 788,547

5 Claims. (Cl. 31—25)

This invention relates to cutting apparatus. The apparatus is particularly useful for cutting cheese and cakes of similar material.

A device having cutter elements or wires extending across a cutter frame on a common level and intersecting centrally of the frame would be unsatisfactory. The mass of wires at the point of intersection present substantially a solid body, which, when drawn through the cheese, force out a center portion of the cheese and thus prevents the forming of clear-cut segments, with pointed inner ends. To provide a cutter which will permit the substantially simultaneous cutting of a cheese body, while at the same time preserving the inner sharp edges of the cheese segments, presents a problem which has not been solved.

An object of the present invention is to provide a cutter which may be forced in one stroke through a body of cheese, and the like, while at the same time providing segments which are clear-cut at their inner and other edges. Yet another object is to provide a cutter having cutting elements extending across the frame of the cutter but which operate separately and successively, whereby the central portion of the cheese, or other material, being severed has even and clear-cut inner edge portions. Yet another object is to provide a cutting device in which a perimetric frame is equipped with transverse cutting elements, the elements crossing each other but being arranged at different elevations, whereby each cutter operates upon the material being severed independently of the other cutters, each cutter element preferably having one end slightly higher than the other. Yet another object is to provide apparatus in which a cake of material to be cut is supported upon a slotted platform, while a cutting device with spaced cutting elements is brought downwardly around the platform with the cutting elements passing through the slots of the platform. A still further object is to provide an improved cake-supporting platform having removable sectors therein which provide between them spaces in which the cutting elements of a cutter are received. Other objects and advantages will appear as the specification proceeds.

The invention is illustrated, in a single embodiment, by the accompanying drawings, in which—

Figure 1 is a side view in elevation of apparatus embodying my invention; Fig. 2, a top plan view of a slotted platform employed in the apparatus, the view being taken as indicated at line 2 of Fig. 1; Fig. 3, a broken top plan view of a cutter embodying my invention, the view being taken as indicated at line 3 of Fig. 1; Fig. 4, a front view in elevation; Fig. 5, a broken transverse sectional view, the section being taken as indicated at line 5 of Fig. 1; and Fig. 6, a perspective view of two sector platform members.

In the illustration given, 10 designates a frame or casing equipped with base members 11. The frame 10 consists mainly of vertical standards 12 supported at their bottoms by the base members 11 and connected by a cross pipe 13. At an intermediate elevation, the two standards 12 are connected by a base plate 14, as shown more clearly in Fig. 1. The plate 14 is supported by bracket members 15 and bolts extending through the bracket members and the plate 14. The plate 14 is apertured at spaced intervals to receive the bolts extending downwardly from the integral posts 17 formed with the sector platforms 18. The sector platforms 18 are supported so that when brought together they form a continuous platform, as illustrated in Fig. 2, except that there are slots 19 extending between the sectors. The resulting construction is one in which there is provided a platform having slots 19 extending diametrically therethrough. The bolts extend through the spaced openings in the plate 14 and are engaged below the plate by nuts 20, as shown more clearly in Fig. 1. The platform provided by the composite sector platforms 18 is illustrated in Figs. 1 and 2 and is adapted to support a cake 21 of cheese or other material to be sliced. While the composite platform is shown as circular in shape, it will be understood that the platform may be of any desired configuration.

I will now describe the cutting apparatus which is employed for severing the cake into the desired number of slices. A plunger 22 is mounted in a guide member 23 carried by the top rail 24 of frame 10, and the plunger is fixed to a U-shaped member 25. The upper end of the plunger 22 is pivotally connected to an operating lever 26, the forward end of the lever being provided with a handle 27, and the rear end of the lever being engaged by a coil spring 28, as shown more clearly in Fig. 1. The lower end of the coil spring 28 is secured by a hook 29 to a bracket 30 carried by the frame. A stabilizing link 31 is pivotally connected at its ends to the frame 10 and to an intermediate point of the lever 26.

The cutter 32 is carried by the ends of the U-shaped member 25. In the illustration given, the cutter comprises a cylindrical member 33 equipped at its bottom with a laterally-extending flange 34, the flange 34 being secured to the ends of the U-shaped member 25.

The cutter cylinder 33 is provided with a plurality of vertically-spaced openings diametrically arranged and adapted to receive wire 35. I prefer to employ piano wire and space the wires vertically an inch or more apart. It will be understood, however, that the spacings may vary depending upon the material to be cut, and that different types of cutting members may be employed. The wire 35 drawn through the various openings in the cylinder 33, may be continuous so as to form all of the cross pieces within the cylinder or, if desired, each wire drawn through the cylinder walls and across the interior of the cylinder may be a separate wire. Any suitable means for securing the wires within the cylinder so as to provide taut bodies extending diametrically across the interior of the cylinder 33, may be emoplyed. One arrangement of the wires is illustrated in Fig. 3, the wires extending diametrically across the body of the cylinder. As shown in Fig. 5, the wires are spaced vertically one from the other so that they cross the center of the cylinder in spaced relation.

In the operation of the apparatus, a cake of cheese, or the like, is placed upon the platform formed by the sectors 18. The handle 27 is then depressed so as to move the operating lever 26 to the position indicated in dotted lines in Fig 1. This movement causes the cylinder 33 to pass around the cake 21 and the wires 35 pass through the cake successively, the cylinder 33 finally reaching the position illustrated in Fig. 5. In this operation, the cake slices formed have sharply defined inner points which are intact, and there is no tendency for the inner portion of the cake to be cut away. The operation is as effective as though separate cuts had been made by separate knife strokes. In fact, the results is better than where the cuts are made by separate knife strokes because the different wires passing through the cake at specified intervals, provide supports for the inner weak edges of the slices during the cutting operation, and the final sliced product is one in which the delicate inner points of the slices are intact even though the sliced material is extremely fragile.

The sliced cake may be removed from the platform while the cutter is in the lower position indicated in Fig. 5, and thereafter the operating handle 27 may be released so that the spring 28 will bring it to its original raised position, as illustrated in Fig. 1.

The sector platforms 18 may be removed for cleaning or replacement. The platforms may be of different sizes so as to cut the cake into slices of different sizes, cutting means having the wires spaced appropriately for such different-sized platforms being used. Further the sectors making up one composite platform may vary in size. For example, two opposite quarters may have segments of 30 degrees while the other two opposite quarters might have segments of 36 degrees. The structure shown provides for the interchangeability of sector platforms of any desired size.

While the transverse cutter wires 35 may be horizontal, I prefer to have the wires sligthly inclined, say, 4° or 5°, so that when the cutting device is moved into the cheese, one end of the wire strikes first and the wire enters the cheese progressively through its length. In other words, one end of the cutting wire is slightly lower in the cutter frame than the other end of the wire.

The structure, both from the standpoint of the platform and the cutter, is variable for slicing a cake into a different number of slices. It will be understood that cutters 32, having different numbers of wires therein, may be substituted for the specific cutter illustrated in the drawings.

While in the foregoing specification, I have set forth a specific construction in considerable detail for the purpose of illustrating one embodiment of the invention, it will be understood that such details of structure may be varied widely by those skilled in the art without departing from the spirit of my invention.

I claim:

1. In slicing apparatus, a frame, a base plate supported in said frame, wells in said base plate, posts receivable in said wells, sector platforms carried by said posts and adapted to provide a composite platform for receiving the cake to be sliced, a cutter member guided in said frame and comprising a frame member adapted to receive said cake and transverse cutter wires fixed in said frame in spaced vertical relation and in alignment with the slots of said platform, and means for raising and lowering said cutter to points above and below said platform.

2. In slicing apparatus, a frame, an operating arm pivotally mounted upon said frame, a plunger carried by said arm and guided for vertical movement, a perimetric frame member, a U-shaped support fixing said frame member to said plunger, wires extending across said frame in diametric relation and in spaced vertical relation, a base plate fixed in said frame, and a platform supported upon said base plate at an elevated position thereabove, said platform being provided with slots aligned with the wires of said perimetric frame, whereby upon the operation of said lever, said perimetric frame is movable to a position above and below said cake.

3. In slicing apparatus, a frame, a platform support for receiving thereon the cake to be sliced, said platform being provided with sector openings passing therethrough, and a cutter member guided in said frame and comprising a frame member adapted to receive said cake and transverse cutter wires fixed in said frame in spaced vertical relation and in alignment with the slots of said platform.

4. In slicing apparatus, a frame, a platform support for receiving thereon the cake to be sliced, said platform being provided with sector openings passing therethrough, and means for raising and lowering said cutter to points above and below said platform.

5. In cake slicing apparatus, a platform for supporting the cake to be sliced, said platform being provided with sector slots extending therethrough, and a cutter comprising a perimetric frame of greater diameter than said platform whereby said frame may be brought to a position above and below said cake, and cutter elements carried by said frame and extending across said frame in different vertical planes, said elements being spaced apart at the center of the frame whereby in the slicing of the cake by the cutter elements said cutter elements act successively upon the cake at the center thereof.

BERTIE S. HARRINGTON.

REFERENCES CITED

The following references are of record in the file of this patent:

UNITED STATES PATENTS

| Number | Name | Date |
|---|---|---|
| 553,434 | Sigmund | Jan. 21, 1896 |
| 883,847 | Ziegler | Apr. 7, 1908 |
| 1,657,483 | Rabin | Jan. 31, 1928 |
| 1,704,509 | Miller | Mar. 5, 1929 |
| 2,247,650 | Carlson | July 1, 1941 |
| 2,310,248 | Marquis et al. | Feb. 9, 1943 |